UNITED STATES PATENT OFFICE.

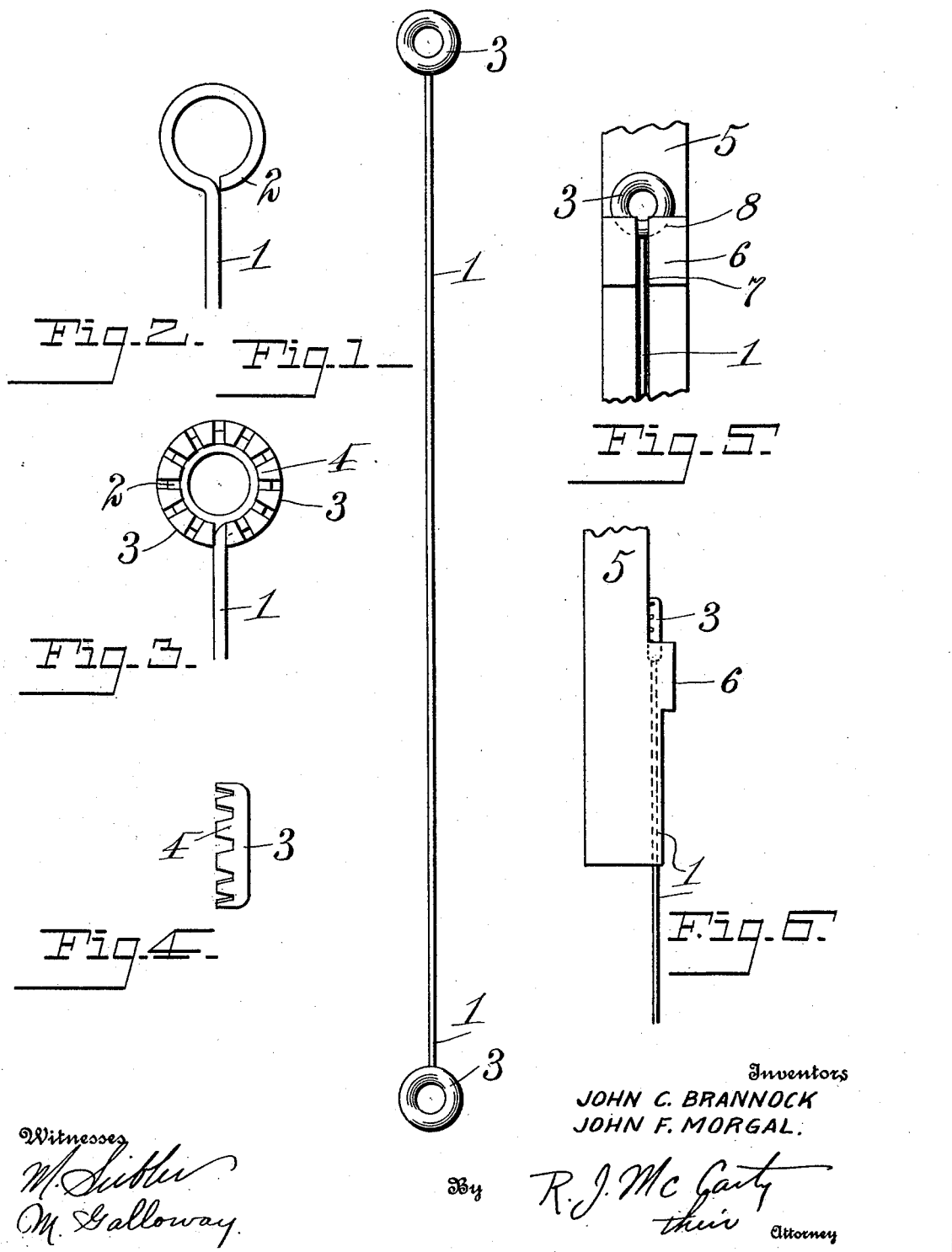

JOHN C. BRANNOCK AND JOHN F. MORGAL, OF DAYTON, OHIO, ASSIGNORS TO THE C. W. RAYMOND COMPANY, OF DAYTON, OHIO.

CUTTING-WIRE FOR BRICK-MACHINES.

1,116,980.  Specification of Letters Patent.  Patented Nov. 10, 1914.

Application filed October 2, 1913. Serial No. 792,976.

*To all whom it may concern:*

Be it known that we, JOHN C. BRANNOCK and JOHN F. MORGAL, citizens of the United States, residing at Dayton, in the county of Montgomery and State of Ohio, have invented certain new and useful Improvements in Cutting-Wires for Brick-Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in the wires which form the cutting reel of brick machines.

It is well known that the cutting reels of brick machines consist of a revolving frame with wires arranged across it for cutting the brick in equal lengths as the clay bar is moved in the path of the reel.

The present invention consists in the construction and fastening of the individual wires.

The object of said invention is to provide wires that will not become elongated when in use and to thus insure the cutting wires remaining taut, and preventing their breakage and any uneven cutting of the brick.

A description of one of the cutting wires will suffice for all as all the wires are similar.

Referring to the drawings, Figure 1 is an elevation of one of the cutting wires; Fig. 2 is a plan view showing the loop formed in the ends of a wire; Fig. 3 is a rear elevation of the complete head of a wire; Fig. 4 is a side elevation of the button which is attached to the loop shown in Fig. 2; Fig. 5 is a front elevation showing a means for securing the wires in position in the reel; and Fig. 6 is a side elevation of the same.

In the specification and drawings, similar reference characters indicate corresponding parts.

Heretofore is has been the practice to form loops on the ends of the cutting wires which are received by suitable pins to hold them. It has been found in practice that these loops are liable to become distorted and to permit the wires to become elongated and slackened with attending disadvantages. In the present invention we have obviated these difficulties by providing on the ends of the wires heads which avoid the ends of the wires becoming distorted. The cutting wire 1 is of the required length and diameter. Formed on the ends thereof are loops or eyes 2 which are united to buttons 3 which form heads on the ends of the individual wires. The buttons 3 are secured to said loops by lugs 4 which are bent over in a manner shown in Fig. 3. The said lugs 4 securely engage the loops or eyes 2 and prevent distortion of said loops or any elongation of the wire when said wire is under tension. The ends of the wires thus provided with apertured heads are secured in a well known manner upon members 5 at each end. The members 5 may be parts of the revolving reel or other support for said wires. The said members 5 are provided with grooves 7 which receive the ends of the wires and act as guides or braces for said wires. The said members 5 are also provided with lugs 6 each having a pocket 8 adapted to receive the buttons or heads 3 of the cutting wires. The pockets 8 are formed by milling a curved notch in the top of the lugs 6, and said members 5 are under the influence of springs, not shown, but which are well known in the art of mounting the cutting wires of brick machines. The said springs exert a tendency to hold the cutting wires taut, and when thus holding said wires they also hold the heads 3 within the pockets 8 thereby maintaining the cutting wires in position. By thus constructing the cutting wires, they will not become elongated due to any strain of the attached means. And, further, the wires may be held taut by a pressure commensurate with the tensile strength of said wires whereby said wires are prevented from becoming distorted during the cutting operations and uniform bricks will be produced.

Having thus described our invention, we claim.

A cutting member for brick machines, comprising an elongated member the ends of which terminate in loops, members secured to said loops and forming therewith heads on the ends of said elongated member, said head-forming members having extensions which engage said loops and thereby reinforce and strengthen the ends of said elongated member.

In testimony whereof we affix our signatures, in presence of two witnesses.

JOHN C. BRANNOCK.
JOHN F. MORGAL.

Witnesses:
MATTHEW SIEBLER,
MELLIE GALLOWAY.

Copies of this patent may be obtained for five cents each, by addressing the "Commissioner of Patents, Washington, D. C."